(12) United States Patent
Raman et al.

(10) Patent No.: US 10,419,342 B2
(45) Date of Patent: *Sep. 17, 2019

(54) GATEWAYS FOR SENSOR DATA PACKETS IN CELLULAR NETWORKS

(71) Applicant: AT&T Mobility II LLC, Atlanta, GA (US)

(72) Inventors: Kaveri Raman, Matawan, NJ (US); Arturo Maria, Bellevue, WA (US); Al Sedghi, Potomac, MD (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,172

(22) Filed: Apr. 23, 2018

(65) Prior Publication Data

US 2018/0248798 A1     Aug. 30, 2018

Related U.S. Application Data

(63) Continuation of application No. 14/855,056, filed on Sep. 15, 2015, now Pat. No. 9,954,778.

(51) Int. Cl.
*H04W 4/70* (2018.01)
*H04L 12/741* (2013.01)
*H04L 12/725* (2013.01)

(52) U.S. Cl.
CPC ............ *H04L 45/74* (2013.01); *H04L 45/308* (2013.01); *H04W 4/70* (2018.02)

(58) Field of Classification Search
CPC .......... H04L 29/06095; H04L 29/0653; H04L 45/74; H04L 49/3009; H04L 49/309; H04W 4/005

USPC ......................................................... 370/392
See application file for complete search history.

(56) References Cited

U.S. PATENT DOCUMENTS

| | | | |
|---|---|---|---|
| 4,866,763 A | 9/1989 | Cooper et al. | |
| 5,987,521 A | 11/1999 | Arrowood et al. | |
| 6,298,130 B1 | 10/2001 | Galvin | |
| 7,782,834 B2 | 8/2010 | Chitrapu | |
| 7,894,944 B2* | 2/2011 | Liu .......................... | G06F 1/206 700/276 |
| 8,228,183 B2* | 7/2012 | Glenn ..................... | H04W 4/70 340/531 |

(Continued)

FOREIGN PATENT DOCUMENTS

| WO | WO 2000062503 | 10/2000 |
|---|---|---|
| WO | WO 2012011094 | 1/2012 |

OTHER PUBLICATIONS

Cugola, Ginpaolo, and Matteo Migliavacca. "A Context and Content-Based Routing Protocol for Mobile Sensor Networks." *Wireless Sensor Networks*. Springer Berlin Heidelberg, 2009. 69-85.

*Primary Examiner* — Robert J Lopata

(57) ABSTRACT

A device may include a processor and a computer-readable medium storing instructions which, when executed by the processor, cause the processor to perform operations for forwarding a sensor data packet. The operations may include receiving the sensor data packet. In one example, the sensor data packet includes a sensor identification, a sensor classification, and sensor data. The operations may further include forwarding the sensor data packet to a second device based upon the sensor identification and the sensor classification.

20 Claims, 5 Drawing Sheets

(56) References Cited

U.S. PATENT DOCUMENTS

| | | |
|---|---|---|
| 8,265,003 B2 | 9/2012 | Fujino |
| 8,514,760 B2 | 8/2013 | Mukherjee |
| 8,779,921 B1* | 7/2014 | Curtiss ................. G08B 25/009 340/506 |
| 8,982,887 B2 | 3/2015 | Curtis et al. |
| 2004/0148083 A1* | 7/2004 | Arakawa ................ G07C 5/008 701/50 |
| 2004/0198254 A1* | 10/2004 | Mizui ...................... G08G 1/20 455/99 |
| 2005/0152285 A1* | 7/2005 | Shimizu .................. H04Q 9/00 370/254 |
| 2009/0253498 A1* | 10/2009 | Wolf ....................... G07F 17/32 463/29 |
| 2009/0296704 A1 | 12/2009 | Kim et al. |
| 2010/0150048 A1* | 6/2010 | Tsai ...................... H04L 12/189 370/312 |
| 2010/0154057 A1* | 6/2010 | Ko ...................... H04L 63/1416 726/23 |
| 2010/0160744 A1* | 6/2010 | Ha .......................... H04W 4/02 600/301 |
| 2011/0133935 A1* | 6/2011 | Beltmann ............. A61B 5/1113 340/573.1 |
| 2011/0182232 A1* | 7/2011 | Padmanabh ........... H04L 67/12 370/328 |
| 2011/0289133 A1* | 11/2011 | Shikano ................. H04L 67/12 709/202 |
| 2012/0177046 A1* | 7/2012 | Yamada ............... H04L 12/4641 370/392 |
| 2013/0039531 A1* | 2/2013 | Basso ..................... G06F 3/005 382/103 |
| 2013/0042011 A1* | 2/2013 | Sugizaki .............. H04Q 3/0045 709/227 |
| 2013/0338958 A1* | 12/2013 | Shanishchara ......... G01C 25/00 702/116 |
| 2014/0085480 A1* | 3/2014 | Saptharishi ........ H04N 21/4621 348/159 |
| 2014/0090547 A1* | 4/2014 | Udell, III ............. G10H 1/0091 84/626 |
| 2014/0140254 A1* | 5/2014 | Nieminen ............... H04W 4/70 370/311 |
| 2014/0315494 A1* | 10/2014 | Son ....................... A61B 5/0002 455/41.2 |
| 2014/0328240 A1 | 11/2014 | Munari et al. |
| 2015/0003309 A1 | 1/2015 | Mukherjee |
| 2015/0029914 A1* | 1/2015 | Elliott ............... H04W 72/1278 370/311 |
| 2015/0078200 A1* | 3/2015 | Kalkunte ................ H04L 45/72 370/254 |
| 2015/0081700 A1 | 3/2015 | Xu et al. |
| 2015/0094989 A1* | 4/2015 | Collet ................. G01L 19/0092 702/188 |
| 2015/0373735 A1* | 12/2015 | Thubert ................. H04W 4/90 370/310.1 |
| 2016/0004657 A1* | 1/2016 | Santesson ............. G06F 13/102 710/8 |
| 2016/0044728 A1* | 2/2016 | Hong .................... H04W 76/14 370/329 |
| 2016/0055509 A1* | 2/2016 | Nyberg ................... G06F 21/44 705/14.1 |
| 2016/0112216 A1* | 4/2016 | Sargent ................... H04L 12/66 370/328 |
| 2016/0359658 A1* | 12/2016 | Yadav ................. H04L 63/1425 |
| 2016/0366213 A1* | 12/2016 | Kazanchian .......... H04W 76/25 |
| 2017/0064491 A1* | 3/2017 | Mirza ..................... H04W 4/70 |
| 2017/0208349 A1* | 7/2017 | Saptharishi ....... G08B 13/19656 |

\* cited by examiner

GATEWAYS FOR SENSOR DATA PACKETS IN CELLULAR NETWORKS

This application is a continuation of U.S. patent application Ser. No. 14/855,056, filed Sep. 15, 2015, now U.S. Pat. No. 9,954,778, which is herein incorporated by reference in its entirety.

Embodiments of the present disclosure relate to the collection of sensor data, and more specifically to devices and networks for collecting sensor data from diverse sensor types and for routing the sensor data in sensor data packets to destination devices.

BACKGROUND

A variety of sensors may gather data with respect to physical parameters relating to outdoor and indoor environments, including for example: temperature, humidity, atmospheric pressure, light level, sound level, and so forth. In some cases, these sensors may also be equipped for network-based communications. For example, a sensor may detect the temperature of a room and may send an alert over one or more types of networks to a homeowner, a building manager, a security service provider, and so forth. Sensors may also be arranged and managed in groups. For example, a number of temperature sensors throughout a building may be used to provide a more detailed insight into how temperatures in the building fluctuate throughout the day, as compared to using a single temperature sensor in a single location in the building.

SUMMARY

In one embodiment, the present disclosure provides a device, computer-readable medium, and method for forwarding a sensor data packet. For example, a device includes a processor and a computer-readable medium storing instructions which, when executed by the processor, cause the processor to perform operations. The operations may include receiving the sensor data packet. In one example, the data packet includes a sensor identification, a sensor classification, and sensor data. The operations may further include forwarding the sensor data packet to a second device based upon the sensor identification and the sensor classification.

In another embodiment, the present disclose provides an additional device, computer-readable medium, and method for forwarding a sensor data packet. For example, a device may include a processor and a computer-readable medium storing instructions which, when executed by the processor, cause the processor to perform operations. The operations may include receiving the sensor data packet. In one example, the sensor data packet includes a sensor identification, a sensor classification, a subscription identification, and sensor data. The operations may further include forwarding the sensor data packet to a second device based upon the subscription identification.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the Figures.

DETAILED DESCRIPTION

Figure 1:
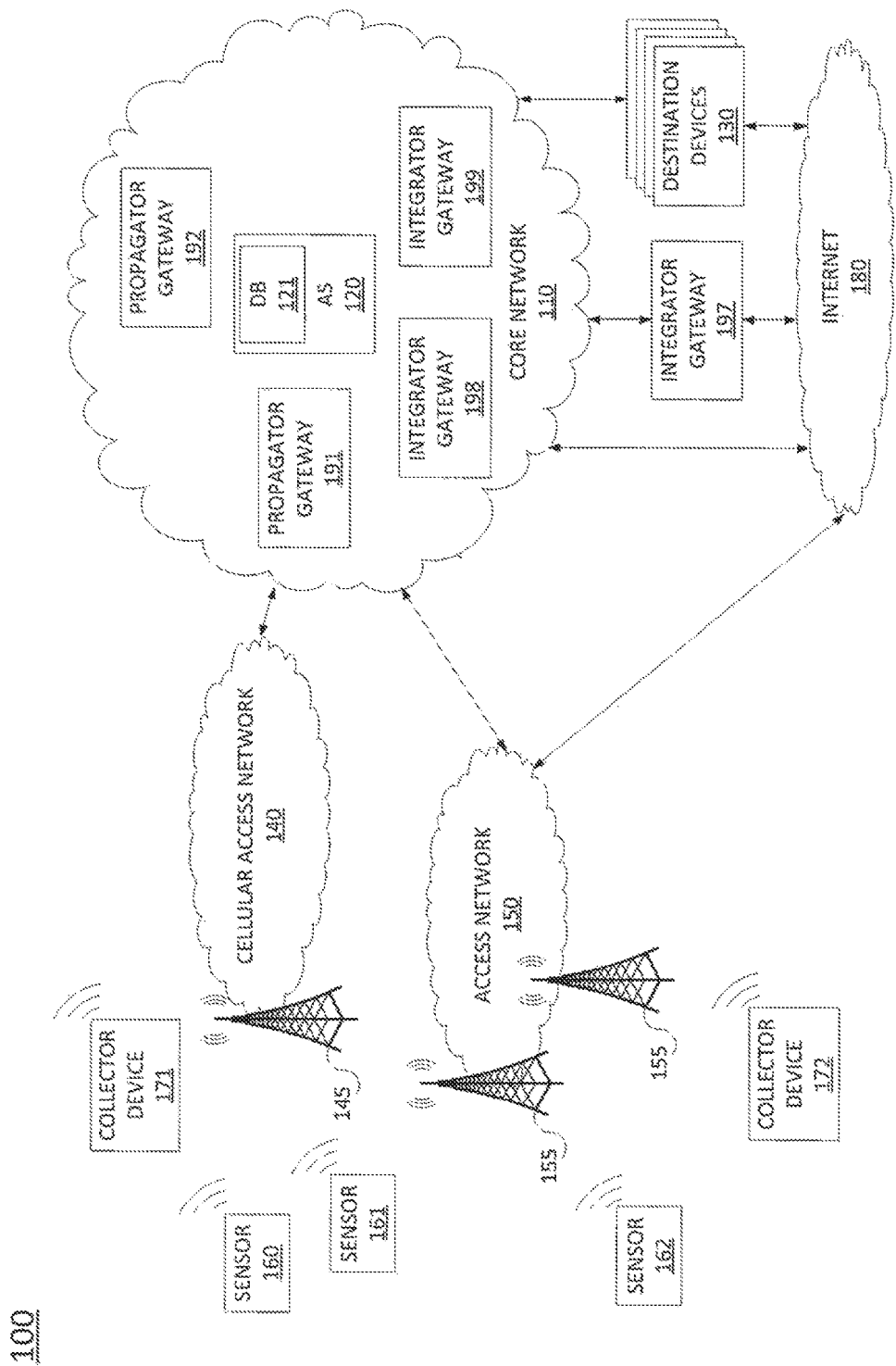
FIG. 1 illustrates an example network related to the present disclosure.

The present disclosure describes devices and networks for moving sensor data from sensors to storage locations or other destination devices. In one example, the sensor data is generated in small data packets. For instance, a data packet for sensor data may comprise a "chirp," which may have e.g., a size/length of four bytes of data or less. The sensors may comprise such sensing devices as: temperatures sensors, pressure sensors, light sensors, e.g., photodetectors, voltage or current sensors, electromagnetic flux sensors, humidity sensors, chemical sensors/detectors, and so forth. Sensor data may therefore include measurements of temperature, humidity, atmospheric pressure, sound level, noise level, air quality, wind speed, chemical concentration, and so forth. Sensor data may also comprise status indications, such as whether a door is open or closed, whether an optical or electromagnetic signal is detected, whether a device is turned on or off, and so forth.

In one example, a sensor data packet may include a sensor identification (sensor ID) and a sensor classification that may be used for aggregating and routing the sensor data packets from a sensor or from multiple sensors. In accordance with the present disclosure, the sensor ID is unique to each sensor such that no sensor ID is associated with more than one sensor. In one example, a sensor ID may be a number, a string, or the like that is uniquely assigned to a sensor by including a manufacturer identification, e.g., a number or string, along with another number or string that identifies a particular sensor model number and an individual sensor. Other conventions for uniquely assigning sensor IDs are possible, e.g., the assignment of sensor IDs can be made consistent across various sensor manufacturers and users.

As used herein, the term "sensor classification" refers a type of sensor or a type of sensor data that the sensor ID is associated with in a sensor data packet. For example, a thermostat may have one type of sensor classification, a speed sensor in a car may have a different type of sensor classification, and so forth. In one example, the sensor classification system may be hierarchical. For example, a sensor classification of a brake sensor could include a first level classification of "commercial," followed, by a second level classification of "automotive," followed by a third level classification of "braking." A sensor classification may also be based on other criteria such as: geography, a type of user, a security level of the sensor data, whether the sensor is "manned" or "unmanned," and so on. In one example, there may be multiple sensor classifications within a sensor data packet. In one example, the sensor classification(s) may be in the header of the sensor data packet.

In one example, the present disclosure provides for multiple gateway devices that may receive sensor data packets from sensors, collect the sensor data packets, and forward the sensor data packets to one or more additional gateway devices or destination devices. In one example, the present disclosure features a first type of gateway device that may be referred to as a chirp propagator gateway (C-PGW), or a "propagator gateway," and a second type of gateway device that may be referred to as chirp integrator gateway (C-IGW) or an "integrator gateway." A propagator gateway may receive sensor data packets, aggregate the sensor data packets based upon the sensor identifications and sensor classifications, and may forward the sensor data packets in sensor data packet streams to respective integrator gateways. In one example, a propagator gateway may temporarily store (e.g., for a predefined period of time) the sensor data packets before sending the sensor data packets that are aggregated in sensor data packet streams. An integrator gateway may collect the sensor data packets and further aggregate or segregate the sensor data packets for various purposes and based upon various criteria. An integrator gateway may also forward sensor data packets to one or more additional integrator gateways, or to one or more destination devices, such as a storage device.

In one example, the aggregating of sensor data packets by the propagator gateways and by the integrator gateways is based upon subscriptions associated with sensor IDs, or sensor IDs in combination with sensor classifications. In one example, subscriptions may be managed by a controller, e.g., a centralized device. However, in another example, subscriptions may be registered directly with propagator gateways and/or integrator gateways. To illustrate, a subscription may identify one or more sensor IDs and one or more sensor classifications. The subscription may also include a subscription identification (subscription ID) and/or an identification of one or more destination devices. For instance, a building manager may deploy a number of sensors in a building to measure temperature and humidity values at different locations throughout the building. The building manager may register one or more subscriptions with a controller that includes the sensor IDs of the deployed sensors. In one example, the building manager may register separate subscriptions with respect to the humidity sensors and the temperature sensors. However, in another example, a single subscription may relate to multiple sensor classifications. To illustrate, a subscription may include a list of the sensor IDs of the sensors deployed in the building. The subscription may also identify a first sensor classification of "humidity" and may specify a first destination device for sensor data packets having the "humidity" sensor classification and a sensor ID that is on the list. The subscription may also identify a second sensor classification of "temperature" and may specify a second destination device for sensor data packets having the "temperature" sensor classification and a sensor ID that is on the list.

In one example, a "destination device" may be identified by an address or other identifier, such as an Internet Protocol (IP) address, a mobile identification number (MIN), a uniform resource locator (URL), and so forth. Thus, in one example, an identifier may not have a fixed relationship with a particular destination device. For instance, a URL may resolve to different destination devices at different times of the day, or may resolve to a backup destination device when a primary destination device is offline for servicing, and so forth. In one example, an identification of a destination device may comprise a subscriber ID. For instance, the building manager may be assigned a subscriber ID, which may comprise a string, an alphanumeric code, or the like, and which may be associated with one or more destination devices, such as a management console, a storage device, and so forth. Thus, the subscriber ID may be resolved to one or more physical destination devices by the integrator gateways and/or other network components. In one example, a destination device may comprise a device of a mass data storage platform, e.g., a server that is part of a data center, a server farm, a cloud-based data storage platform, and so forth. However, in another example, a destination device may comprise a device where the sensor data packets are to be analyzed, manipulated, and otherwise utilized to manage building, properties, and other environments as well as equipment, such as ships, airplanes, automobiles, and so forth. For instance, the destination device may comprise a management console, an automated management server, a technician's laptop computer, and so forth.

In one example, subscriptions may be registered by sensor owners, managers, or other interested parties with a controller which, in one example, may comprise a device that is provided by and deployed in a cellular network service provider network. The controller may then register the subscription(s) with one or more integrator gateways for receiving sensor data from one or more propagator gateways that pertain the sensor ID and sensor classifications contained in the subscription(s). The controller may further register the subscription(s) with one or more propagator gateways. However, in another example, integrator gateways that receive subscriptions from the controller may propagate the subscriptions to one or more propagator gateways (as well as to one or more other integrator gateways). In other words, the integrator gateways may register the subscriptions with the propagator gateways. The propagator gateways may therefore be listening for certain sensor data packets based upon sensor IDs and sensor classifications provided in the subscriptions that are registered with the respective propagator gateways.

In one example, a propagator gateway may grab a sensor data packet that matches a subscription that is registered with the propagator gateway, append the sensor data packet with a subscription ID associated with the subscription, and route the sensor data packet to one or more integrator gateways according to the subscription ID and/or an identification of a destination device in the subscription. For example, in some cases, a subscription registered with a propagator gateway may not include an identification of a destination device. However, routing of the sensor data packet to one or more integrator gateways may be accomplished using only the subscription ID. In addition, in one example the sensor data packet may be sent in a stream of sensor data packets based upon the subscription ID, where the stream includes other sensor data packets matching the same subscription criteria, e.g., having a sensor ID, or sensor ID and sensor classification that is contained in the subscription. In one example, a sensor data packet, or a stream of sensor data packets may be routed to one or more additional propagator gateways prior to being routed to an integrator gateway. For instance, a network may comprise a hierarchical series of propagator gateways to funnel sensor data packets from a large number of sensors to a smaller number of integrator gateways. In one example, as an alternative to an identification of a destination device, a subscription registered with a propagator gateway may identify another propagator gateway or an integrator gateway to receive the sensor data packets that match the subscription. For example, a subscription may be propagated from a controller to an integrator gateway, and from the integrator gateway to a propagator gateway (and, in some cases, to multiple propagator gateways), where the integrator gateway may identify itself to the propagator gateway, thereby requesting that packets matching the subscription be forwarded by the propagator gateway to the integrator gateway.

The integrator gateways may receive various sensor data packet streams from various propagator gateways. The integrator gateways may further aggregate sensor data packets, e.g., into larger streams as compared to those that are created by the propagator gateways, and may forward the sensor data packets, or streams of sensor data packets to other integrator gateways and/or to various destination devices. For instance, a network may comprise a hierarchical series of integrator gateways to further funnel sensor data from a large number of propagator gateways to a smaller number of integrator gateways and destination devices. In one example, the integrator gateways provide further aggregation of sensor data packets based upon the subscription ID, where the stream includes other sensor data packets matching the same subscription criteria, e.g., having a sensor ID, or sensor ID and sensor classification that is contained in the subscription. For example, two propagator gateways may receive different sensor data packets that match the same subscription. Thus, the respective propagator gateways may append the respective sensor data packets with the associated subscription ID and may forward the respective sensor data packets to an integrator gateway in two different streams. In one example, the integrator gateway may then include both sensor data packets in a combined stream. The subscriptions that are registered with the integrator gateways may include a subscription ID and an identification of a destination device such that the integrator gateways may route sensor packets having the particular subscription ID (which may be appended by a propagator gateway) to the appropriate destination device.

As mentioned above, an integrator gateway may receive a subscription from a controller. In turn, the integrator gateway may register the subscription with one or more propagator gateways, where the subscription registered with the propagator gateway(s) requests that sensor data packets matching the subscription be forwarded by the propagator gateway(s) to the integrator gateway. However, in another example, the sensor data packets may be routed by the propagator gateways based upon the sensor ID and/or sensor classification, without any particular subscriptions being registered. For example, a controller may configure a propagator gateway to route all sensor data packets having a sensor classification of "temperature" to a first integrator gateway and to route all sensor data packets having a sensor classification of "humidity" to a second integrator gateway. In another example, a first propagator gateway in a first geographic area may be configured, e.g., via instructions from the controller, to route all sensor data packets to a first integrator gateway, while a second propagator gateway in a second geographic area may be configured to route all sensor data packets to a second integrator gateway. In one example, the first and second integrator gateways may then inspect the sensor data packets, append those sensor data packets that match a subscription with the associated subscription ID, and forward the sensor data packets that match a subscription to other integrator gateways or destination devices.

In one example, sensor data packets may be contained within IP packets. However, it should be noted that in such case, routing to destination devices is not controlled by the IP headers, but by the sensor ID, the sensor classification, and/or the subscription ID. In other words, IP packets may be used to transport the sensor data packets between propagator gateways, integrator gateways, and destination devices, where the IP routing hop-to-hop may be controlled by the sensor ID, sensor classification, and/or the subscription ID. In another example, the propagator gateways, the integrator gateways, and an intermediate devices in the network paths connecting the gateways may be configured to receive and route sensor data packets that are not further encapsulated. In this case, network and transport layer routing may follow a protocol specific to the sensor data packets of the present disclosure.

In one example, a propagator gateway (for sensor data packets) may comprise a physical device. For instance, a propagator gateway may comprise a front end processor or other component of a gateway support node (GSN) or similar network element. In another example, a propagator gateway may comprise a service-defined network (SDN) element that is created when needed, but does not exist when there are no sensor data packets to be processed, e.g., in the portion of the network where the propagator gateway may be utilized. Similarly, integrator gateways may comprise fixed or virtual network elements and may physically reside in a core network, e.g., in an evolved packet core (EPC), in a national or regional data center, or in the cloud, e.g., in one or more devices of one or more data centers of a cloud service provider. For example, an integrator gateway may comprise or be integrated with a GSN or similar network element, e.g., as a front-end processor or as software defined component of the GSN. In one example, a controller, e.g., an application server, may be tasked with creating and releasing instances of propagator gateways and integrator gateways. In one example, the controller may also configure the propagator gateways and integrator gateways to handle subscriptions. Thus, the integrator gateways may be listening for different sensor data packets coming from different propagator gateways depending upon how the different integrator gateways and propagator gateways are configured by the controller.

In one example, the integrator gateways may further route sensor data packets based upon the locations of the sensors from which the sensor data packets are collected. For instance, in one example a sensor may be equipped to detect the location of the sensor and to include the location as part of the sensor data packet, e.g., in addition to any sensor data comprising measurements of the sensor. In another example, the location information may be appended to the sensor data packet after the sensor data packet has been initially transmitted by the sensor. For instance, a propagator gateway may be the first point of contact for the sensor data packet (where the sensor data packet is inspected for routing). If the propagator gateway is in a particular area, the sensor data packet may be tagged with the location of the propagator gateway. However, if the propagator gateway is the first propagator gateway receiving the sensor data packet, the propagator gateway may further connect to and communicate with location-based servers in a cellular network to determine with greater accuracy where the sensor data packet is coming from. For instance, the sensor may comprise a device that is registered with a cellular network such that the location of the sensor may be tracked by the location-based servers in the cellular network. For example, the sensor may have a subscriber identity module (SIM) or may provide identifying data in another manner that can be used to announce a presence of the sensor and to register with the cellular network. The location of the sensor may therefore be detected and stored in one or more location-based servers of the cellular network based upon the SIM data and/or other identifying data. The propagator gateway may therefore query a location-based server using the SIM data or other identifying data, and the location-based server may return the location of the sensor. In one example, the present disclosure features an additional device type that may be referred to as a "collector" or "collector device," which includes a SIM or other module with identification data that may be used for authenticating multiple sensors. For instance, a home gateway may be a collecting point of sensor data packets for all sensors in a home, where the home gateway authenticates to the cellular network using a single SIM. Thus, in one example the home gateway may function as a collector device. In another example, sensor data packets may alternatively or additionally be received via a wireless local area network (WLAN) or a wide-area network (WAN), in which case a SIM or similar registration/authentication mechanism may not be required.

In one example, certain sensor classifications may be included in the sensor data packet as it is transmitted by a sensor. However, in another example, sensor classifications may alternatively or additionally be appended to the sensor data packet after transmission by the sensor. For instance, in one example, the location information may be considered to be one type of sensor classification. Thus, one sensor data packet may have a sensor classification of "east" while another sensor data packet may have a sensor classification of "west." In addition, as described above, the location information may be included by a sensor in the sensor data packet or may be appended by a propagator gateway. Another example of a sensor classification that may be included in the sensor data packet may comprise a security classification. Thus, certain sensor data packets with a higher security classification may be aggregated and routed differently than sensor data packets with a lower security classification. For instance, the sensor data packets may be routed to different integrator gateways and/or different destination devices. Alternatively, or in addition, some of the sensor data packets may be encrypted and/or sent via a virtual private network path, while other sensor data packets do not receive such processing. It should be noted that a security classification, as well as various additional types of sensor classifications may be included in the sensor data packet by the sensor or by a propagator gateway processing the sensor data packet, such as the first propagator gateway that receives the sensor data packet on route to the destination device.

Advantageously, in accordance with the present disclosure, sensor data is aggregated and appended prior to being received by the destination device, e.g., a storage device. In this way, the destination device may receive sensor data packets that are prearranged in useful ways that may be defined in advance. In addition, the sensor data packets may be efficiently processed through the network via the prearrangement of sensor data packets into sensor data packet streams and through the use of subscriptions, such that certain propagator gateways and integrator gateways may be listening for packets that match registered subscriptions, and may ignore or discard sensor data packets that do not match registered subscriptions. In contrast, destination devices that receive sensor data without aggregation (e.g., sensor data that is simply encapsulated in an IP packet and sent to the destination device directly from the sensor), may be required to devote extra computing resources for parsing the sensor data packets, rearranging the sensor data packets after receipt, discarding unnecessary information, and so forth.

These and other aspects of the present disclosure are discussed in greater detail below in connection with the example FIGS. 1-5.

To aid in understanding the present disclosure, FIG. 1 illustrates in greater detail an example system 100 that is suitable for use in connection with processing sensor data packets according to the present disclosure. Although the present disclosure is discussed below in the context of a particular system or network architecture, the present disclosure is not so limited. Namely, the present disclosure can be applied to any type of communication network that is capable of transmitting data, such as a local area network (LAN), a wireless local area network (WLAN), an Internet Protocol (IP) network, such as an Internet Protocol/Multi-Protocol Label Switching (IP/MPLS) core network, an IP Multimedia Subsystem (IMS) network, a combination of any of such networks, and so forth.

As shown in FIG. 1, the system 100 connects sensors 160-162, collector devices 171-172, propagator gateways 191-192, integrator gateways 197-199, application server 120 (e.g., a centralized controller for creating, releasing, and managing gateways for processing sensor data packets), and destination devices 130 (e.g., one or more storage devices) via a core Internet Protocol (IP) network 110, a cellular access network 140, an access network 150, and/or Internet 180. In one example, cellular access network 140 may comprise a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, cellular access network 140 may comprise an access network in accordance with any "second generation" (2G), "third generation" (3G), "fourth generation" (4G), Long Term Evolution (LTE) or any other yet to be developed future wireless/cellular network technology. While the present disclosure is not limited to any particular type of cellular access network, in the illustrative example, cellular access network 140 is shown as a UMTS terrestrial radio access network (UTRAN) subsystem. Thus, element 145 may comprise a Node B or evolved Node B (eNodeB). In addition, although only one cellular access network 140 is illustrated, it should be appreciated that the network 100 may include multiple cellular access networks of the same or different types.

In one example, access network 150 may comprise a non-cellular access network such as a wireless local area network (WLAN), an IEEE 802.11 network, a "wired" access network, e.g., a local area network (LAN), such as an Ethernet network, an enterprise network, a metropolitan area network (MAN), a digital subscriber line (DSL) network, a cable network, a hybrid network utilizing a plurality of such technologies, and so forth. Thus, in one example access network 150 may include at least one wireless communication point 155, which may comprise a wireless access point/wireless router, an IEEE 802.11 access point, a ZigBee access point, a Bluetooth Low Energy (BLE) beacon, and so forth. In one example, access network 150 may comprise a local network of a residence or business, e.g., a single-family dwelling, an apartment building, a hotel, an office building, a school, a hospital, a corporate or educational campus comprising multiple buildings, and the like. In one example, access network 150 may include multiple wireless communication points 155 of different types.

In one example, core network 110 comprises a telecommunication service provider network with network devices or elements (not shown) which are capable of routing and forwarding packets between different hosts over the network. In one example, the network devices of core network 110 may be for routing IP packets. However, in one example, the components of core network 110 may have additional functions, e.g., for functioning as a public land mobile network (PLMN)-General Packet Radio Service (GPRS) core network, for providing Voice over Internet Protocol (VoIP), Service over Internet Protocol (SoIP), and so forth, and/or may utilize various different technologies, e.g., Asynchronous Transfer Mode (ATM), Frame Relay, multi-protocol label switching (MPLS), and so forth. Thus, it should be noted that although core network 110 is described as an Internet Protocol network in one example, this does not imply that the functions are limited to IP functions, or that the functions are limited to any particular network layer. In accordance with the present disclosure, some or all of the network components of core network 110 may also be for processing, e.g., routing, forwarding, storing, etc., sensor data packets having at least a sensor ID, a sensor classification, and sensor data contained therein. For instance, core network 110 may include propagator gateways 191-192 and integrator gateways 198-199.

As illustrated in FIG. 1, core network 110 also includes an application server (AS) 120, which may comprise a controller for creating, releasing, and managing gateways for processing sensor data packets. In this regard, the application server 120 may also include a database (DB) 121 for storing instructions and other information relating to creating, releasing, and managing gateways for processing sensor data packets, in accordance with the present disclosure. Thus, in one example, AS 120 may comprise any hardware server or computer that is well known in the art, and database 121 may be any type of electronic collection of data that is also well known in the art. In one example, an AS 120 may take the form of device 500 illustrated in FIG. 5 and described in greater detail below.

As illustrated in FIG. 1, sensors 160-162 may have one or more wireless connections to access networks 140 and 150. For example, sensors 160 and 161 may communicate wirelessly via element 145 of cellular access network 140 or via wireless communication points 155 of access network 150. Thus, each of the sensors 160-162 may have either or both of cellular and non-cellular access capabilities. In addition, sensors 160 and 161 may monitor the same or different physical parameters as sensor 162.

As illustrated in FIG. 1, network 100 may also include collector devices 171 and 172. Collector devices 171 and 172 may comprise devices that receive sensor data and transmit sensor data packets to access network components, e.g., of cellular access network 140 and/or access network 150. For example, sensor 162 may be a non-digital device without a SIM, without an antenna that is capable of cellular or WLAN communications, and so forth. For example, sensor 162 may transmit sensor data using basic analog wireless communications. Collector device 172 may be equipped to receive the sensor data from sensor 162, create sensor data packets, each with a sensor ID, a sensor classification, sensor data, and in some cases a subscription ID, and to transmit the sensor data packets in a format that is suitable for reception by cellular access network 150. Similarly, sensor 160 may transmit sensor data packets via a non-cellular wireless protocol, which may be received by collector device 171. Collector device 171, in turn, may re-transmit the sensor data packets using cellular communication to cellular access network 140. For instance, collector device 171 may have a SIM that is used to register and enable communication with cellular access network 140.

The above network 100 is described to provide an illustrative environment in which examples of the present disclosure may be employed. In other words, the network 100 is merely illustrative of one network configuration that is suitable for implementing embodiments of the present disclosure. Thus, the present disclosure may also include any other different network configurations that are suitable for implementing embodiments of the present disclosure, for conveying sensor data packets among devices. For example, while the application server 120, propagator gateways 191-192 and integrator gateways 198-199 are illustrated as components of core network 110 in FIG. 1 and while destination device(s) 130 are illustrated as being accessible via the Internet 180, this particular configuration of network 100 is provided for illustrative purposes only. In other words, in other, further and different examples, propagator gateways 191-192, integrator gateways 198-199, application server 120, destination device(s) 130, and any other components and devices of network 100 may be alternatively deployed. For instance, network 100 may additionally include integrator gateway 197, which may be controlled by an entity subscribing to and receiving sensor data at one of destination devices 130. In general, network 100 may be expanded by including additional sensors, propagator gateways, integrator gateways, destination devices, access networks, network elements, application servers, etc., or may be modified to subtract or substitute components illustrated in FIG. 1, without altering the scope of the present disclosure. Thus, these and other variations are all contemplated within the scope of the present disclosure.

Figure 2:
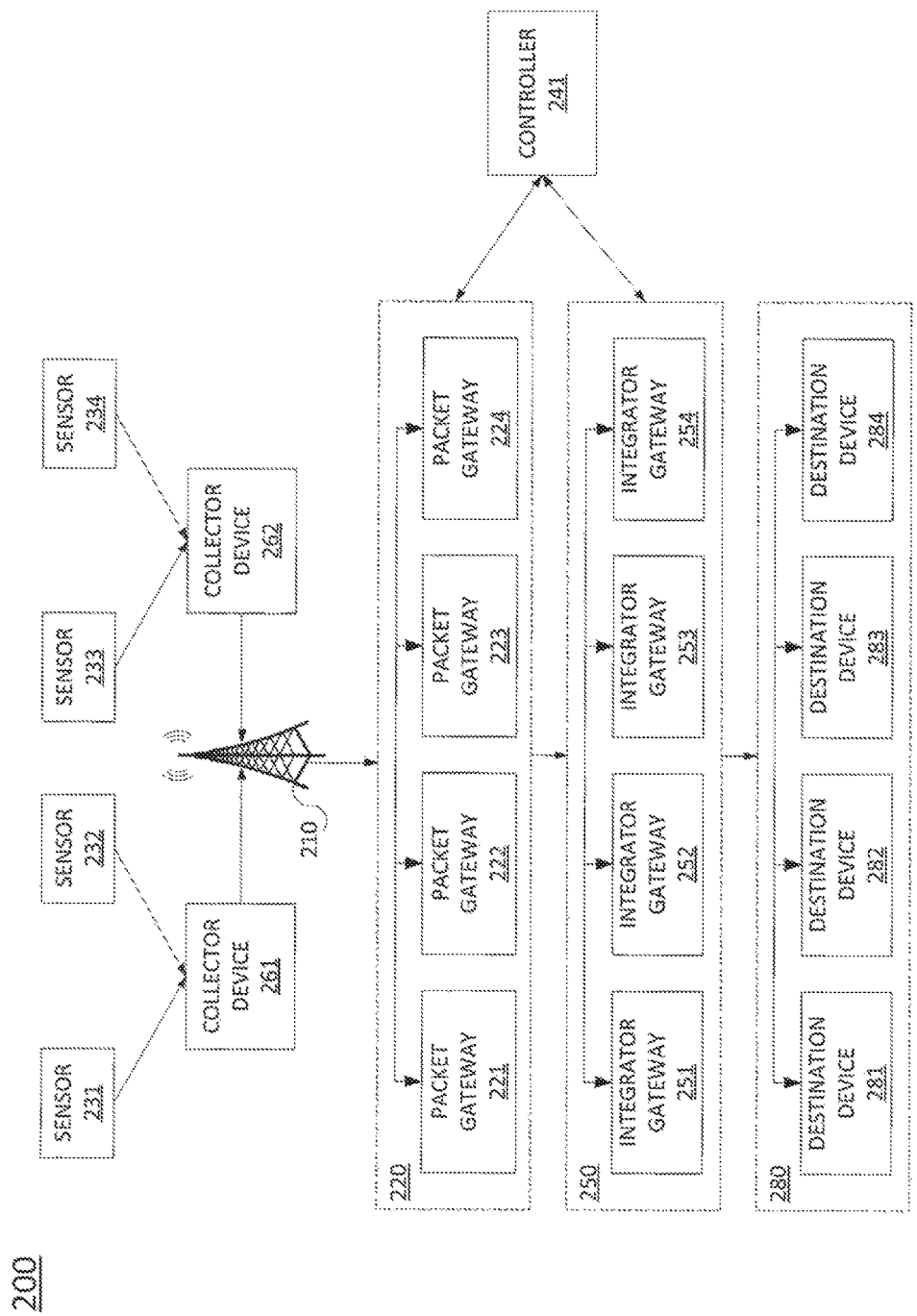
FIG. 2 illustrates an example system for forwarding a sensor data packet, according to one example of the present disclosure.

To further aid in understanding the present disclosure, FIG. 2 illustrates an example network or system 200 of the present disclosure for processing sensor data packets. Any of the devices and components illustrated in FIG. 2 may send and receive sensor data, sensor data packets, and other information via multiple communication modalities. Thus, in some cases, the communications may occur entirely within a local network, or may traverse one or more service provider networks/public networks, e.g., any one or more of the networks illustrated in FIG. 1.

System 200 includes multiple sensors, e.g., sensors 231-234. Some of the sensors may transmit sensor data packets directly to the cellular/wireless access point 210, e.g., a base station, a base transceiver station (BTS), a Node B, an eNodeB, a wireless router, or the like. For example, sensor 233 may transmit sensor data packets directly to cellular/wireless access point 210. In one example, sensor 233 may include a SIM or may have other credentials for registering and communicating with cellular network components. Other sensors in system 200 may initially convey sensor data and/or sensor data packets to collector devices, such as collector devices 261 and 262. For example, sensors 231, 232, and 234 may lack cellular communication capabilities, while collector devices 261 and 262 are so equipped. Collector devices 261 and 262 may be further equipped to create sensor data packets for sensors that transmit sensor data to the collector devices 261 and 262. For example, sensor 231 may comprise a sensor that is not capable of generating sensor data packets that include at least a sensor ID and a sensor classification. Thus, in one example, the collector device 261 may minimally receive sensor data from sensor 231, and may create a sensor data packet with a sensor ID, a sensor classification, and the sensor data for forwarding to the cellular/wireless access point 210.

Cellular/wireless access point 210 serves as a conduit to pass sensor data packets to gateway devices, where the sensor data packets are appended with additional data, aggregated into sensor data packet streams, and forwarded to other gateways devices and/or to destination devices. Although a single cellular/wireless access point 210 is shown in FIG. 2, it should be appreciated that the system 200 may include multiple cellular/wireless access points of a same type or of multiple different types.

In the present example, sensor data packets may be received by a set of propagator gateways 220 from the cellular/wireless access point 210. In one example, the set of propagator gateways 220 may reside within a core network, e.g., an evolved packet core. However, in another example, at least a portion of the propagator gateways 221-224 in the set of propagator gateways 220 may reside in an access network, such as a cellular access network, a wide area network (WAN), a LAN, and so forth. In one example, copies of a single sensor data packet may be routed to multiple propagator gateways 221-224 in the set of propagator gateways 220.

In one example, different propagator gateways in the set of propagator gateways 220 may be listening for sensor data packets that meet a certain criteria. For instance, propagator gateway 221 may be listening for sensor data packets with a sensor classification of "temperature," while propagator gateway 222 may be listening for data packets with a sensor classification of "humidity." Thus, propagator gateway 221 may collect sensor data packets with a sensor classification of "temperature" while discarding or ignoring sensor data packets that do not have this sensor classification. Similarly, propagator gateway 222 may collect sensor data packets with a sensor classification of "humidity" while discarding or ignoring sensor data packets that do not have this sensor classification. In one example, propagator gateways 221 and 222 may be listening for sensor data packets based upon subscriptions that are received from integrator gateways 251-254 or from a controller 241. However, in another example propagator gateways of the set of propagator gateways 220 may be alternatively configured. For instance, propagator gateways 223 and 224 may process all sensor data packets that are received by the respective propagator gateways. In one example, propagator gateway 223 may be assigned to receive sensor data packets from a first geographic area and/or from a first set of cellular/wireless access points, while propagator gateway 224 may be assigned to receive sensor data packets from a second geographic area and/or from a second set of cellular/wireless access points. For instance, the assignments may be provided by controller 241. In such example, propagator gateways 223 and 224 may not receive copies of the same sensor data packets, but may receive sensor data packets only from the respective areas and/or sets of cellular/wireless access points that are assigned. In addition, the propagator gateways 223 and 224 may reside in entirely different networks, in different physical locations that are part of the same or different networks, and so forth.

As illustrated in FIG. 2, system 200 further includes a set of integrator gateways 250 comprising integrator gateways 251-254. In one example, the integrator gateways 251-254 receive sensor data packets from propagator gateways in the set of propagator gateways 220 according to subscriptions. For instance, in one example, integrator gateway 251 may register a subscription with propagator gateways 221 and 222 to receive sensor data packets with a sensor classification of "temperature" and with sensor IDs associated with any of sensors 231, 232, and 233. In one example, integrator gateway 251 may send the same subscription to both of propagator gateways 221 and 222. However, in another example, integrator gateway 251 may send separate subscriptions to propagator gateways 221 and 222. For instance, integrator gateway 251 may be aware that propagator gateway 221 is assigned to a first geographic area that includes sensors 231 and 232, while propagator gateway 222 is assigned to a second geographic area that includes sensor 233. Therefore, integrator gateway 251 may register a first subscription with propagator gateway 221 to receive sensor data packets with a sensor classification of "temperature" and with sensor IDs associated with sensors 231 and 232, and may register a second subscription with propagator gateway 222 to receive sensor data packets with a sensor classification of "temperature" and with a sensor ID associated with sensor 233.

In one example, the subscription, or subscriptions may include a subscription ID, and an identification of the subscribing integrator gateway 251 and/or an identification of one or more destination devices. The subscription ID may be used by the propagator gateways 221 and 222 to append the sensor data packets that match the subscription(s) with the subscription ID. In this case, subsequent routing of the sensor data packets may utilize the subscription ID and an identification of the destination device. In other words, the integrator gateway may route the sensor data packets by matching the subscription ID append to the sensor data packets by the propagator gateways 221 and 222 to an identification of a destination device (or multiple destination devices). Thus, in one example, there is no need to reexamine the sensor IDs and sensor classifications in the sensor data packets that are appended with the subscription ID.

It should be noted that additional propagator gateways and integrator gateways may be configured in the paths between sensors and one or more destination devices. In such case, subscriptions may also be registered with these intermediate devices. In one example, the subscriptions associated with these intermediate devices may include the subscription ID, and an identification of a next hop gateway (e.g., either a next propagator gateway or a next integrator gateway) and/or an identification of a destination device. Thus, in one example, routing of sensor data packets that are appended to include a subscription ID may be made without further examination of the sensor IDs and/or sensor classification of the sensor data packets.

As mentioned above, system 200 may further include a controller 241. In one example, controller 241 is for creating and releasing instances of propagator gateways in the set of propagator gateways 220. In one example, the propagator gateways in the set of propagator gateways 220 may reside in different network portions in different locations. For instance, propagator gateway 223 may reside in an east coast data center, while propagator gateway 224 may reside in a west coast data center. In one example, controller 241 is further for creating and releasing instances of integrator gateways in the set of integrator gateways 250. In one example, the integrator gateways in the set of integrator gateways 250 may reside in different network portions in different locations. For example, the integrator gateways in the set of integrator gateways 250 may reside in different regional data centers of a cellular network provider. Alternatively, or in addition, some or all of the integrator gateways in the set of integrator gateways 250 may reside in a national data center, or may even reside in a customer/subscriber network, such as in a local network of a home, office, educational institution, and so forth. In one example, some or all of the propagator gateways in the set of propagator gateways 220 and/or integrator gateways in the set of integrator gateways 250 may comprise virtual machines that are created and released on physical devices, as needed. Alternatively, or in addition, some or all of the propagator gateways in the set of propagator gateways 220 and/or integrator gateways in the set of integrator gateways 250 may comprise stand-alone devices or may comprise dedicated hardware, such as a front end processors, or a combination of hardware and software of existing cellular network devices, including devices in a radio access network, a packet core, such as in an EPC, and so forth.

In one example, controller 241 is further for registering subscriptions with propagator gateways in the set of propagator gateways 220 and/or integrator gateways in the set of integrator gateways 250. For example, controller 241 may receive subscriptions from devices of sensor owners, sensor managers, and so on for collecting sensor data packets and forwarding the sensor data packets to selected destination devices. The subscriptions may include a number of sensor IDs, one or more sensor classifications, a subscription ID, and/or an identification of one or more destination devices. In one example, the controller 241 may register the subscriptions with integrator gateways in the set of integrator gateways 250, where an integrator gateway in the set of integrator gateways 250 may register a same subscription or one or more derivative subscriptions with one or more propagator gateways in the set of propagator gateways 220, one or more additional integrator gateways in the set of integrator gateways 250, and so on. In another example, the controller 241 may register a subscription directly with a propagator gateway, where the subscription may identify the one or more destination devices, or may identify one or more next-hop devices to forward sensor data packets matching the subscription, e.g., an intermediate propagator gateway or an integrator gateway.

System 200 may further include a set of destination devices 280, which may comprise destination devices 281-284. The destination devices 281-284 may be identified in subscriptions that are registered with integrator gateways in the set of integrator gateways 250. Destination devices in the set of destination devices 280 may therefore receive sensor data packets from integrator gateways in the set of integrator gateways 250. Notably, the sensor data packets may be received in streams of sensor data packets, where each stream may include sensor data packets that match a same subscription, e.g., having sensor IDs in a list of sensor IDs in the subscription, and having sensor classifications that match one or more sensor classifications in the subscription. The sensor data packets may be pre-appended with additional information such as a time that the sensor data was collected and/or a location of the sensor.

The set of propagator gateways 220, the set of integrator gateways 250, and the cellular/wireless access point 210 may comprise component of a cellular service provider network. In other words, the sensor data packets may be processed by non-public cellular network infrastructure. In addition, the sensor data packets may be encrypted and send via a virtual private network (VPN) path between the integrator gateways in the set of integrator gateways 250 and the destination devices in the set of destination devices 280. As such, the sensor data packets may privately and securely be collected from sensors 231-234 and forwarded to destination devices 281-284.

Figure 3:
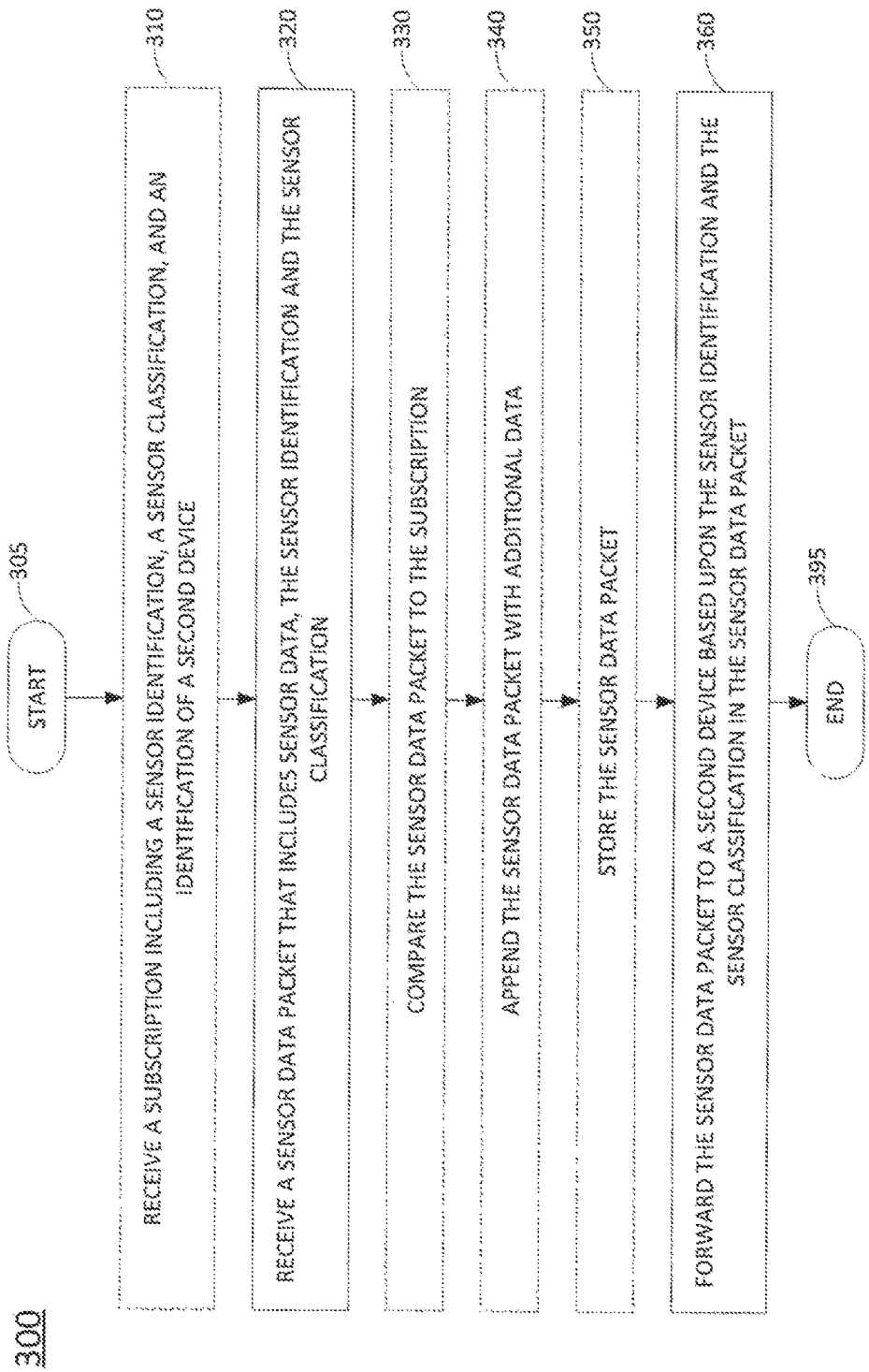
FIG. 3 illustrates a flowchart of an example method of the present disclosure for forwarding a sensor data packet.

FIG. 3 illustrates a flowchart of a method 300 of the present disclosure for forwarding a sensor data packet. In one embodiment, the method 300 is performed by a propagator gateway, e.g., as illustrated in FIG. 1 or FIG. 2. In another example, the method 300 is performed by an integrator gateway, e.g., as illustrated in FIG. 1 or FIG. 2. Alternatively, or in addition, the steps, functions, or operations of method 300 may be performed by a device or system 500, and/or processor 502 as described in connection with FIG. 5 below, specifically programmed to perform the steps, functions and/or operations of the method. For illustrative purposes, the method 300 will now be described in terms of an embodiment where steps of the method are performed by a processor of a device, such as processor 502 in FIG. 5.

Method 300 starts in step 305 and may proceed to optional step 310. In optional step 310, the processor may receive a subscription that includes a sensor ID, a sensor classification, and an identification of an additional device. In one example, the subscription may include multiple sensor IDs, multiple sensor classifications, and an identification of multiple additional devices. In one example, each sensor ID may be associated with at least one sensor classification in the subscription. For instance, a sensor may measure multiple physical parameters, where the subscription may have an interest in only one, or several of the physical parameters. In one example, the additional device that is identified in the subscription may comprise a destination device, such as a server of a cloud-based data storage platform, a management console, a technician's device, and so on. In another example, the intermediate device may comprise a propagator gateway or integrator gateway. For instance, the processor may comprise a processor of a propagator gateway or integrator gateway, and the subscription may identify another propagator gateway or integrator gateway to which the processor should send sensor data packets that match the subscription. In one example, the processor may comprises a processor of a propagator gateway, and the subscription may be received from an integrator gateway, from a controller, or from a different propagator gateway. In another example, the processor may comprise a processor of an integrator gateway, and the subscription may be received from the controller or from a different integrator gateway.

In step 320, the processor receives a sensor data packet that includes sensor data, the sensor identification, and the sensor classification. In one example, the sensor data packet is received from a sensor. In another example, the sensor data packet is received from one or more intermediate devices, such as from a cellular base station, a wireless access point, such as wireless router of a WLAN, a base station controller (BSC) or radio network controller (RNC), a GPRS gateway support node (GGSN), and so forth. In one example, the sensor data packet may be received from a collector device, a propagator gateway, or an integrator gateway for sensor data packets. For example, the processor may be a processor of a propagator gateway or integrator gateway, and may receive the sensor data packet from a different propagator gateway or integrator gateway. However, in any case, the sensor data packet may initially be transmitted and sent wirelessly by the sensor.

The sensor ID may comprise a number, a string, an alphanumeric code, or a similar identifier that is unique to a sensor, such that no sensor ID is associated with more than one sensor. The sensor data in the sensor data packet may comprise measurements of a physical environment such as temperature, humidity, atmospheric pressure, light level, sound level, air quality, wind speed, chemical concentration, and so forth. Sensor data may also comprise status indications, such as whether a door is open or closed, whether an optical or electromagnetic signal is detected, whether a device is turned on or off, and so forth. The sensor classification may identify a type of sensor that originated the sensor data packet or a type of sensor data that is contained in a sensor data packet. For example, a thermostat may have one type of sensor classification, a speed sensor in a car may have a different type of sensor classification, and so forth. In one example, the sensor classification system may be hierarchical. For example, a sensor classification of a brake sensor could include a first level classification of "commercial", followed, by a second level classification of "automotive," followed by a third level classification of "braking." A sensor classification may also be based on other criteria such as: geography, a type of user, a security level of the sensor data, whether the sensor is "manned" or "unmanned," and so on.

In optional step 330, the processor compares the sensor data packet to the subscription that may be received at optional step 310. For example, the processor may confirm that the sensor ID and the sensor classification of the sensor data packet matches a sensor ID and sensor classification of the subscription. It should be noted that the processor may ignore or discard the sensor data packet if the sensor data packet does not match any subscription that is registered with a device of the processor (e.g., where the processor is a processor of a propagator gateway or an integrator gateway). However, for subsequent steps of the present method 300, it is assumed that the sensor data packet matches the subscription.

In optional step 340, the processor appends the sensor data packet with additional data. For example, the processor may add time information, location information, security information, and so forth to the sensor data packet. For example, the time information may comprise a time that the sensor data packet is received. If the processor is a processor of a first propagator gateway that receives the sensor data packet from the sensor, the time may be sufficiently close to the time that the sensor data was actually collected by the sensor and can be used as the time the sensor data was collected. Similarly, the location information may comprise the location of the sensor or a collector device, which may be stored by a location-based server of a cellular network. For example, the sensor or collector device may have a SIM which is used to register with the cellular network. Thus, the location of the sensor may be determined to be the location of a base station serving the sensor, or may be refined based upon a cellular triangulation technique using multiple base stations, or using a similar technique, and such location may be stored by a location-based server of the cellular network. The processor may therefore query the location-based server using the sensor ID contained in the sensor data packet, and may receive the location in return. In one example, the additional data may comprise one or more additional sensor classifications that are added to the sensor data packet. In one example, the additional data may comprise a subscription ID of the subscription that matches the sensor data packet. For instance, if the sensor ID and the sensor classification match the subscription, the processor may append the sensor data packet with the subscription ID. Subsequent gateway devices processing the sensor data packet may then route the sensor data packet using the subscription ID, and may not need to further refer to the sensor ID and the sensor classification.

In optional step 350, the processor stores the sensor data packet. For instance, the processor may comprises a component of a propagator gateway or an integrator gateway, and may be configured to create sensor data packet streams comprising multiple sensor data packets that match a particular subscription. For example, there may be multiple sensor data packets relating to temperature readings by several temperature sensors that are all encompassed by the subscription. The processor may therefore collect the sensor data packets over a period of time, such as five minute intervals, one hour intervals, and so forth, after which all of the sensor data packets matching the subscription may be sent to another device, such as a destination device or an intermediate gateway device, e.g., a propagator gateway or an integrator gateway. Accordingly, the processor may store the sensor data packet temporarily, e.g., in a tangible, non-transitory computer-readable storage medium, while awaiting aggregation with other sensor data packets to be sent to a next device.

In step 360, the processor forwards the sensor data packet to a second device based upon the sensor identification and the sensor classification in the sensor data packet. For example, the processor may receive a subscription at optional step 310 that identifies a second device, such as a next gateway device or a destination device where sensor data packets matching the subscription should be sent. Thus, step 360 may comprise forwarding the sensor data packet to the second device that is identified in the subscription. In one example, step 360 may comprise forwarding the sensor data packet to the second device in a sensor data packet stream of a plurality of sensor data packets that match the subscription. For example, the stream may comprise sensor data packets of a same sensor that are generated at different times, or may comprise sensor data packets from different sensors having a same sensor classification for which the sensor IDs were included in a list of sensor IDs in the subscription. In one example, the sensor classification of the sensor data packet may comprise a geographic area Thus, in one example, a plurality of sensor data packets in a steam that may be sent at step 360 may further be grouped together based upon geographic area. For example, the stream may comprise sensor data packets of a plurality of different sensors from the geographic area, wherein the geographic area is defined in a subscription.

In another example, the processor may not have received any subscriptions. For instance, the processor may be configured to forward all sensor data packets that have a first type of sensor classification to a first integrator gateway and to forward all sensor data packets having a second type of sensor classification to a second integrator gateway. Alternatively, or in addition, the processor may be configured to forward sensor data packets with a first type of sensor classification and a sensor ID in a particular range of sensor IDs to a first integrator gateway, and to forward all sensor data packets with a sensor type of sensor classification and a sensor ID in a another range of sensor IDs to a second integrator gateway. In one example, the processor may be configured via instructions from a controller.

Following step 360, the method 300 proceeds to step 395 where the method ends.

Figure 4:
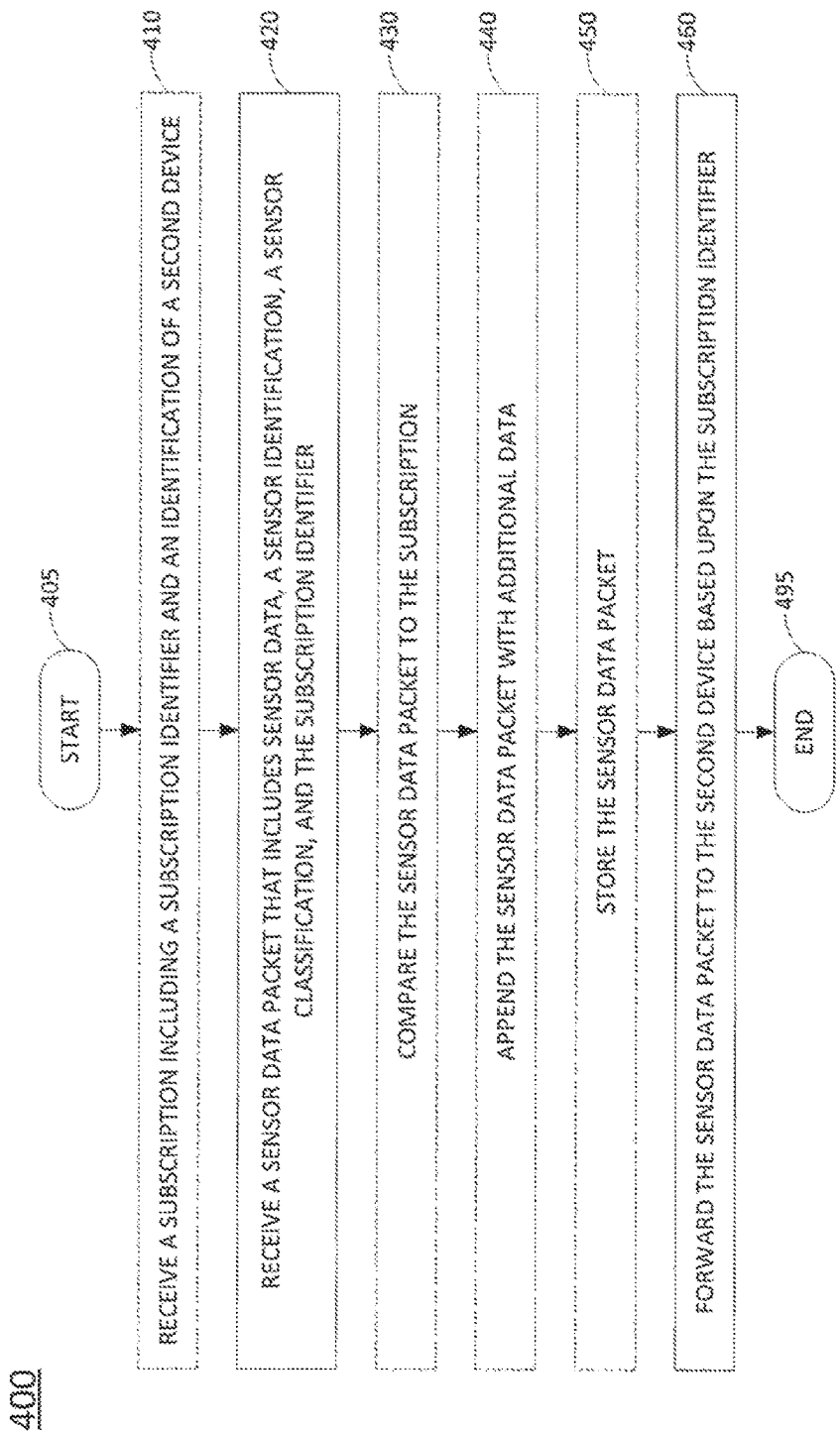
FIG. 4 illustrates a flowchart of an additional example method of the present disclosure for forwarding a sensor data packet.

FIG. 4 illustrates a flowchart of a method 400 of the present disclosure for forwarding a sensor data packet. In one embodiment, the method 400 is performed by a propagator gateway, e.g., as illustrated in FIG. 1 or FIG. 2. In another example, the method 400 is performed by an integrator gateway, e.g., as illustrated in FIG. 1 or FIG. 2. Alternatively, or in addition, the steps, functions, or operations of method 400 may be performed by a device or system 500, and/or processor 502 as described in connection with FIG. 5 below, specifically programmed to perform the steps, functions and/or operations of the method. For illustrative purposes, the method 400 will now be described in terms of an embodiment where steps of the method are performed by a processor of a device, such as processor 502 in FIG. 5.

Method 400 starts in step 405 and may proceed to optional step 410. In optional step 410, the processor receives a subscription including a subscription identification (subscription ID) and an identification of a second device to which sensor data packets matching the subscription should be forwarded. In one example, the subscription may further include one or more sensor IDs and one or more sensor classifications. In one example, the second device may comprise a destination device. In another example, the second device may comprise a propagator gateway or an integrator gateway for sensor data packets. For instance, the processor may comprise a processor of another propagator gateway or integrator gateway, where the second device that is identified in the subscription comprises a next hop device in a routing of the sensor data packet to a destination device. In one example, the processor may comprises a processor of a propagator gateway, and the subscription may be received from an integrator gateway, from a controller, or from a different propagator gateway. In another example, the processor may comprise a processor of an integrator gateway, and the subscription may be received from the controller or from a different integrator gateway.

In step 420, the processor receives a sensor data packet that includes sensor data, a sensor ID, a sensor classification, and the subscription ID. In one example, the sensor data packet may be received from a sensor. In another example the sensor data packet may be received from a collector device, from a propagator gateway, or from an integrator gateway. For example, the processor may comprise a processor of a propagator gateway or an integrator gateway, and may receive the sensor data packet from a different propagator gateway or integrator gateway. Nevertheless, the sensor data packet may have been originated by a sensor that initially transmitted and sent the packet wirelessly. In addition, in one example, the sensor may include a subscription ID in the sensor data packet. However, in another example, the sensor data packet may have been appended with the subscription ID, for example, by a first propagator gateway processing the sensor data packet, before being received by the processor at step 420.

In optional step 430, the processor compares the sensor data packet to the subscription. In one example, optional step 430 may comprise confirming that the subscription ID in the sensor data packet matches the subscription ID of the subscription received at step 410. It should be noted that step 430 may comprise a different operation from that of step 330 of the method 300. For example, step 330 may involve comparing a sensor ID and/or sensor classification in the sensor data packet with one or more sensor ID and/or sensor classifications in the subscription, whereas step 430 may involve comparing the subscription ID from the sensor data packet with the subscription ID of the subscription, without referring to the sensor ID or the sensor classification of the sensor data packet.

In optional step 440, the processor appends the sensor data packet with additional data. For example, the processor may add time information, location information, security information, and so forth. In one example, optional step 440 may comprise the same or similar operations to that described above in connection with step 340 of the method 300, e.g., depending upon whether the processor is a processor of a propagator gateway or integrator gateway.

In optional step 450, the processor stores the sensor data packet. For instance, the processor may comprises a component of a propagator gateway or an integrator gateway, and may be configured to create sensor data packet streams comprising multiple sensor data packets that match a particular subscription. Accordingly, the processor may store the sensor data packet temporarily, e.g., in a tangible, non-transitory computer-readable storage medium, while awaiting aggregation with other sensor data packets to be sent to a next device (e.g., the "second device"). In one example, step 450 may comprise the same or similar operations to that described above in connection with step 350 of the method 300.

In step 460, the processor forwards the sensor data packet to the second device based upon the subscription ID. For example, the processor may receive a subscription at optional step 410 that identifies a second device, such as a next gateway device or a destination device where sensor data packets matching the subscription should be sent. Thus, step 460 may comprise forwarding the sensor data packet to the second device that is identified in the subscription, e.g., when the sensor data packet includes a subscription ID that matches the subscription ID of the subscription. In one example, the second device may comprise a destination device. In another example, the second device may comprise a propagator gateway or an integrator gateway. For instance, the processor may comprise a processor of another propagator gateway or integrator gateway, where the second device that is identified in the subscription comprises a next hop device in a routing of the sensor data packet to a destination device.

Following step 460, the method 400 proceeds to step 495 where the method ends.

In addition, although not specifically specified, one or more steps, functions or operations of the method 300 or the method 400 may include a storing, displaying and/or outputting step as required for a particular application. In other words, any data, records, fields, and/or intermediate results discussed in the method 300 or the method 400 can be stored, displayed, and/or outputted either on the device executing the respective method or to another device, as required for a particular application.

Furthermore, steps, blocks, functions, or operations in FIGS. 3 and 4 that recite a determining operation or involve a decision do not necessarily require that both branches of the determining operation be practiced. In other words, one of the branches of the determining operation can be deemed as an optional step. Moreover, steps, blocks, functions, or operations of the above described method 300 or method 400 can be combined, separated, omitted, and/or performed in a different order from that described above, without departing from the examples of the present disclosure.

As such, the present disclosure provides at least one advancement in the technical field of sensor networks. In particular, in one example, the present disclosure includes new sensor types, new network-based devices such as propagator gateways, integrator gateways, and a centralized controller for managing the propagator gateways and integrator gateway. The new network-based devices are configured to use subscriptions that include one or more sensor identifications, one or more sensor classifications, and a subscription identifier. The new network-based devices are also configured to receive and process a new sensor data packet type that includes a sensor identification, a sensor classification, sensor data, and in some cases a subscription identification. In addition, the new sensor types are configured to create and transmit sensor data packets of the new sensor data packet type described above. Advantageously, in accordance with the present disclosure, sensor data is aggregated and appended prior to being received by a destination device, e.g., a storage device. In this way, the destination device may receive sensor data packets that are prearranged in useful ways that may be defined in advance. In addition, the sensor data packets may be efficiently processed through the network via the pre-arrangement of sensor data packets into sensor data packet streams and through the use of subscriptions, such that certain propagator gateways and integrator gateways may be listening for packets that match registered subscriptions, and may ignore or discard sensor data packets that do not match registered subscriptions.

The present disclosure also provides a transformation of data. For example, various pieces of data are transformed into a sensor data packet that include sensor data, e.g., measurements and observations of the physical environment, a sensor identification, a sensor classification, and in some cases, a subscription identification. In addition, the sensor data packets may be further transformed by appending the sensor data packets with additional data, such as time information, location information, security information, and so forth, prior to being forwarded to other intermediate devices and/or destination devices.

Finally, examples of the present disclosure improve the functioning of a computing device, e.g., a server. Namely, new types of servers or server components for processing sensor data packets, e.g., propagator gateways and integrator gateways for sensor data packets, are provided. The new propagator gateways and integrator gateways of the present disclosure receive subscriptions that are based upon sensor IDs and sensor classifications in sensor data packets, receive sensor data packets, compare the sensor data packets to the subscriptions, and forward the sensor data packets to second devices, such as another propagator gateway or integrator gateway, or to a destination device, such as a storage server, when a sensor data packet matches a subscription. Notably, no previous server has performed these functions as described herein. For example, previous devices or servers may simply forward sensor data from a sensor to a destination device using IP routing, without the use of subscriptions and without the use of sensor data packets based upon sensor identifications, sensor classifications, and/or subscription identifications. Finally, a new type of server, e.g., a centralized controller, is also provided to create, release, and/or manage instances of propagator gateways and integrator gateways, to receive and register subscriptions, and to perform other functions in connection with new sensor data packets of the present disclosure. Notably, no previous server has performed the functions of a centralized controller as described herein.

Figure 5:
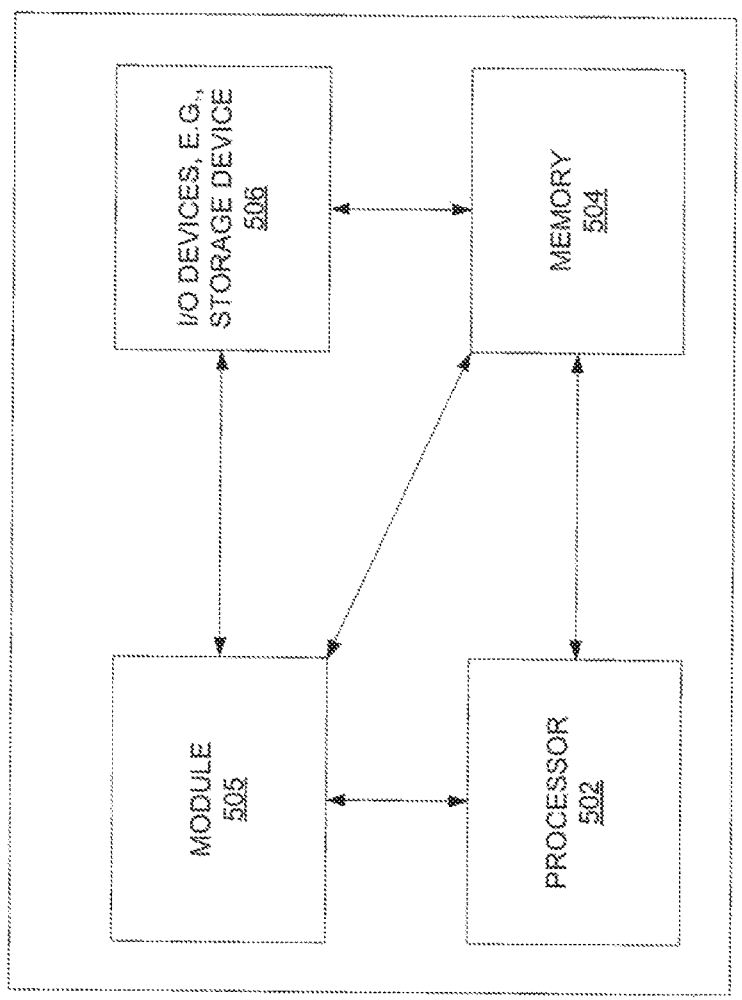
FIG. 5 illustrates a high-level block diagram of a computer suitable for use in performing the functions, methods and algorithms described herein.

FIG. 5 depicts a high-level block diagram of a computing device suitable for use in performing the functions described herein. As depicted in FIG. 5, the system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for forwarding a sensor data packet, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300 or the method 400 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

The one or more hardware processors 502 can also be configured or programmed to cause other devices to perform one or more operations as discussed above. In other words, the one or more hardware processors 502 may serve the function of a controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed methods. In one embodiment, instructions and data for the present module or process 505 for forwarding a sensor data packet (e.g., a software program comprising computer-executable instructions) can be loaded into memory 504 and executed by hardware processor element 502 to implement the steps, functions or operations as discussed above in connection with the illustrative methods 300 and/or 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer-readable or software instructions relating to the above described methods can be perceived as a programmed processor or a specialized processor. As such, the present module 505 for forwarding a sensor data packet (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:
1. A device comprising:
a processor; and a computer-readable medium storing instructions which, when executed by the processor, cause the processor to perform operations, the operations comprising:
receiving a sensor data packet, wherein the sensor data packet comprises:
a sensor identification;
a sensor classification; and
sensor data;
comparing the sensor data packet to a subscription; and
forwarding the sensor data packet to a second device based upon the sensor identification and the sensor classification of the sensor data packet, wherein the forwarding the sensor data packet to the second device is performed when the sensor identification and the sensor classification of the sensor data packet match a sensor identification and a sensor classification in the subscription.

2. The device of claim 1, wherein the sensor data packet is received from a sensor via a wireless connection.

3. The device of claim 1, wherein the operations further comprise:
appending the sensor data packet with additional data comprising at least one of:
location data; or
time data.

4. The device of claim 1, wherein the sensor data packet that is received is appended with additional data, wherein the forwarding the sensor data packet to the second device is further based upon the additional data.

5. The device of claim 4, wherein the sensor data packet is received from a sensor via an intermediate device.

6. The device of claim 1, wherein the operations further comprise:
storing the sensor data packet.

7. The device of claim 6, wherein the forwarding the sensor data packet to the second device includes forwarding the sensor data packet in a sensor data packet stream of a plurality of sensor data packets that are stored by the device.

8. The device of claim 7, wherein the plurality of sensor data packets comprises sensor data packets having a same sensor classification.

9. The device of claim 7, wherein the plurality of sensor data packets comprises sensor data packets of a same sensor that are generated at different times.

10. The device of claim 7, wherein the plurality of sensor data packets comprises sensor data packets of a plurality of different sensors from a geographic area, wherein the geographic area is defined in the subscription.

11. The device of claim 1, wherein the operations further comprise:
storing the sensor data packet prior to the forwarding the sensor data packet to the second device, when the sensor identification and the sensor classification of the sensor data packet match the sensor identification and the sensor classification in the subscription.

12. A device comprising:
a processor; and
a computer-readable medium storing instructions which, when executed by the processor, cause the processor to perform operations, the operations comprising:
receiving a sensor data packet, wherein the sensor data packet comprises:
a sensor identification;
a sensor classification;
a subscription identification; and
sensor data; and
forwarding the sensor data packet to a second device that is identified based upon the subscription identification.

13. A method comprising:
receiving, by a processor, a sensor data packet, wherein the sensor data packet comprises:
a sensor identification;
a sensor classification; and
sensor data;
comparing, by the processor, the sensor data packet to a subscription; and
forwarding, by the processor, the sensor data packet to a second device based upon the sensor identification and the sensor classification of the sensor data packet, wherein the forwarding the sensor data packet to the second device is performed when the sensor identification and the sensor classification of the sensor data packet match a sensor identification and a sensor classification in the subscription.

14. The method of claim 13, wherein the sensor classification is associated with a type of a sensor.

15. The method of claim 13, wherein the sensor identification comprise a unique identifier of a sensor.

16. The method of claim 15, wherein the sensor identification includes an identification of a manufacturer of a sensor.

17. The method of claim 13, further comprising:
appending the sensor data packet with additional data comprising at least one of:
location data; or
time data.

18. The method of claim 13, wherein the sensor data packet that is received is appended with additional data, wherein the forwarding the sensor data packet to the second device is further based upon the additional data.

19. The method of claim 18, wherein the sensor data packet is received from a sensor via an intermediate device.

20. The method of claim 13, further comprising:
storing the sensor data packet prior to the forwarding the sensor data packet to the second device, when the sensor identification and the sensor classification of the sensor data packet match the sensor identification and the sensor classification in the subscription.

* * * * *